(12) United States Patent
Kumazaki et al.

(10) Patent No.: US 8,141,954 B2
(45) Date of Patent: Mar. 27, 2012

(54) SWITCHING MECHANISMS OF VEHICLE SEATS

(75) Inventors: Yoshiyuki Kumazaki, Aichi-ken (JP); Masumi Konaka, Seto (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 381 days.

(21) Appl. No.: 12/486,110

(22) Filed: Jun. 17, 2009

(65) Prior Publication Data

US 2009/0315378 A1  Dec. 24, 2009

(30) Foreign Application Priority Data

Jun. 24, 2008 (JP) ................... 2008-164104

(51) Int. Cl.
    *B60N 2/20* (2006.01)
(52) U.S. Cl. .................. 297/341; 297/378.12
(58) Field of Classification Search .......... 297/341, 297/378.12
    See application file for complete search history.

(56) References Cited

U.S. PATENT DOCUMENTS

| | | | |
|---|---|---|---|
| 4,634,180 A * | 1/1987 | Zaveri et al. | 297/341 |
| 6,106,067 A * | 8/2000 | Zhuang et al. | 297/361.1 |
| 6,152,533 A | 11/2000 | Smuk | |
| 6,799,801 B2 * | 10/2004 | Niimi et al. | 297/378.12 |
| 6,857,702 B2 * | 2/2005 | Becker et al. | 297/341 |
| 6,986,551 B2 | 1/2006 | Ohba | |
| 7,086,698 B2 * | 8/2006 | Shiraki | 297/367 R |
| 7,393,056 B2 * | 7/2008 | O'Connor | 297/378.12 |
| 7,690,728 B2 * | 4/2010 | Miyauchi et al. | 297/378.12 |
| 2001/0040400 A1 * | 11/2001 | Kamida et al. | 297/354.13 |
| 2008/0284197 A1 | 11/2008 | Fukuda et al. | |

FOREIGN PATENT DOCUMENTS

| | | |
|---|---|---|
| JP | 2004-58928 | 2/2004 |
| JP | 2005-225262 | 8/2005 |
| JP | 2007-130237 | 5/2007 |
| JP | 2008-114690 | 5/2008 |

OTHER PUBLICATIONS

English language Abstract of JP 2004-58928, Feb. 26, 2004.
English language Abstract of JP 2005-225262, Aug. 25, 2005.
English language Abstract of JP 2007-130237, May 31, 2007.
English language Abstract of JP 2008-114690, May 22, 2008.

* cited by examiner

*Primary Examiner* — Peter R. Brown
(74) *Attorney, Agent, or Firm* — Greenblum & Bernstein, P.L.C.

(57) ABSTRACT

A switching mechanism of a vehicle seat includes a base element, an output arm pivotally connected to the base element via a first pivot shaft, an input arm having a force input point and pivotally connected to the output arm via a second pivot shaft as a rotational center, and an input arm biasing member. When a force is applied to the input arm, the input arm can be rotated around the first pivot shaft in the normal rotational direction while contacting the first pivot shaft, so that the second pivot shaft can pivot about the first pivot shaft, thereby rotating the output arm about the first pivot shaft with the input arm to rotate the seat back from a seating position into one of a walk in position and a folded position. The input arm may also be configured to rotate the seat back to the seating position.

7 Claims, 7 Drawing Sheets

SWITCHING MECHANISMS OF VEHICLE SEATS

This application claims priority to Japanese patent application serial number 2008-164104, the contents of which are incorporated herein by reference.

BACKGROUND OF THE INVENTION

The present invention relates to switching mechanisms of vehicle seats. More particularly, the present invention relates to switching mechanisms of vehicle seats that are capable of switching slide lock devices between locked conditions and unlocked conditions.

Conventionally, a vehicle seat (a front vehicle seat) having a walk-in function is already known. The vehicle seat is arranged and constructed to make a space between the seat and a rear seat when a passenger gets in and out the rear seat. In particular, such a vehicle seat is arranged and constructed such that a seat back of the seat is rotated forwardly from a predetermined rotational position or use (vertical) position to a rotated or tilted position while a seat cushion of the seat (the entire seat) is slid forwardly. According to this construction, it is possible to easily make space between the seat and the rear seat. Therefore, the passenger can easily get in and out the rear seat via the space.

Such a vehicle seat is taught, for example, by Japanese Laid-Open Patent Publication Number 2004-58928, which corresponds to U.S. Pat. No. 6,986,551. The seat has a fold-down function of a seat back of the seat in addition to the walk-in function. Therefore, the seat back can be rotated forwardly from a use (vertical) position to a folded position.

The seat has a slide lock device that can be changed or switched between a locked condition in which the seat cushion is allowed to slide relative to a floor and an unlocked condition in which the seat cushion is not allowed to slide relative to the floor. The slide lock device is associated with a switching mechanism that is capable of switching the slide lock device between the locked condition and the unlocked condition.

The slide lock device is constructed to be switched to the unlocked condition via the switching mechanism when the walk-in function is used (i.e., when the passenger gets in and out the rear seat). Further, the slide lock device is constructed to be switched to the unlocked condition and then be immediately returned to the locked condition (before the seat back reaches the folded position) via the switching mechanism when the fold-down function is used.

In particular, the switching mechanism includes a link mechanism that is linked to the slide lock device. The link mechanism is arranged and constructed to switch the slide lock device to the unlocked condition when the seat back is rotated forwardly from the use position toward the folded position over a desired angle (when the seat back is rotated to a desired tilted position). That is, when the seat back is rotated to the desired tilted position, the link mechanism is operated or moved by a force caused by rotational motion of the seat back, so as to switch the slide lock device to the unlocked condition.

Further, when the seat back is maintained in the desired tilted position, the link mechanism of the switching mechanism is maintained in an operable condition. As a result, the slide lock device is maintained in the unlocked condition. However, when the seat back can be rotated toward the folded position beyond the desired tilted position, the link mechanism of the switching mechanism is changed to an inoperable condition. As a result, the slide lock device is switched to the locked condition again.

Further, when the seat back is raised or rotated backwardly from the folded position toward the use position, the link mechanism of the switching mechanism can be maintained in the inoperable condition. As a result, the slide lock device is maintained in the locked condition.

BRIEF SUMMARY OF THE INVENTION

For example, in one embodiment of the present invention, a switching mechanism of a vehicle seat includes a base element, an output arm pivotally connected to the base element via a first pivot shaft, an input arm having a force input point and pivotally connected to the output arm via a second pivot shaft as a rotational center, and an input arm biasing member. The input arm biasing member is arranged and constructed to normally bias the input arm in a normal rotational direction, so that the input arm can contact the first pivot shaft at a middle portion of the force input point and the rotational center. When a normal directional input force is applied to the input arm, the input arm can be rotated around the first pivot shaft in the normal rotational direction while contacting the first pivot shaft, so that the second pivot shaft can pivot about the first pivot shaft, thereby rotating the output arm about the first pivot shaft with the input arm. When a reverse directional input force is applied to the input arm, the input arm can be independently rotated in a reverse rotational direction about the second pivot shaft against a spring force of the biasing member.

According to the switching mechanism thus constructed, when the normal directional input force is applied to the input arm, the input arm can be rotated around the first pivot shaft in the normal rotational direction while contacting the first pivot shaft. As a result, the output arm can be rotated about the first pivot shaft. At this time, the input arm can be rotated around the first pivot shaft and not about the second pivot shaft. As a result, when the input arm is rotated in the normal rotational direction, the input arm may have a reduced radius of rotation. Conversely, when the reverse directional input force is applied to the input arm, the input arm can be idly rotated in the reverse rotational direction about the second pivot shaft. As a result, when the input arm is idly rotated in the reverse rotational direction, the input arm may have an increased radius of rotation.

Thus, according to the present switching mechanism, the input arm can be rotated in the reduced radius of rotation in the normal rotational direction. To the contrary, the input arm can be rotated in the increased radius of rotation in the reverse rotational direction. As a result, the switching mechanism can be downsized without reducing performance thereof.

In another embodiment of the invention, the input arm is arranged and constructed to be rotated in the normal or reverse rotational direction when the input arm is engaged with a moving member.

In a further embodiment of the invention, the input arm is arranged and constructed to be rotated in the reverse rotational direction with the output arm when the input arm is disengaged from the moving member after the input arm is rotated in the normal rotational direction. Further, the input arm is arranged and constructed to be independently rotated in the normal rotational direction when the input arm is disengaged from the moving member after the input arm is rotated in the reverse rotational direction.

In a further embodiment of the invention, the moving member comprises a rotary cam having an engagement projection that is engageable with the input arm. Further, the second pivot shaft is positioned so as to be offset from a line of action of a pressing force applied to the input arm via the engagement projection when the rotary cam is rotated in a normal rotational direction and is then rotated in a reverse rotational direction immediately before the engagement projection is disengaged from the input arm.

In a further embodiment of the invention, the rotary cam is attached to a seat back so as to be rotated with the seat back. When the seat back is rotated from a use position to a half-folded position, the input arm is rotated in the normal rotational direction by the engagement projection of the rotary cam, so that the output arm can be rotated from an initial rotational position to an actuating rotational position with the input arm. When the seat back is rotated toward a folded position beyond the half-folded position, the input arm is disengaged from the engagement projection of the rotary cam, so that the output arm can be returned to the initial rotational position with the input arm.

The output arm may preferably be linked to a slide lock device of the vehicle seat, so as to unlock the slide lock device when the output arm is rotated to the actuating rotational position.

Other objects, features, and advantages, of the present invention will be readily understood after reading the following detailed description together with the accompanying drawings and the claims.

DETAILED DESCRIPTION OF THE INVENTION

In the following, a detailed representative embodiment of the present invention will be described with reference to FIGS. 1 to 7.

Figure 1:
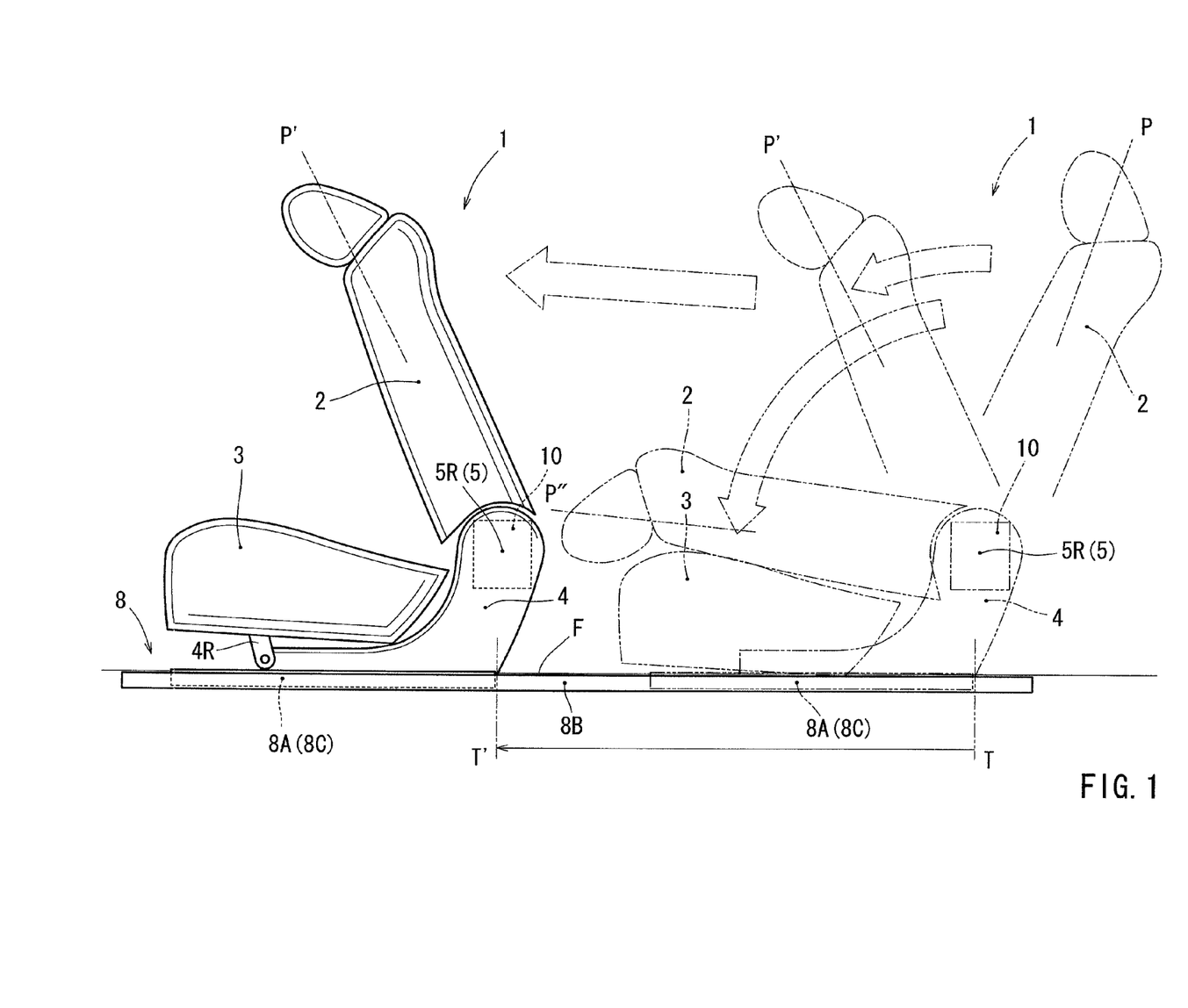
FIG. 1 is a side view of a vehicle seat having a switching mechanism of the present invention, which schematically illustrates motion of the vehicle seat.

Before describing the representative embodiment in detail, a summary of the representative embodiment will be provided. As shown in FIG. 1, a vehicle seat 1 having a switching mechanism 10 may preferably include a seat back 2 (a movable element), a seat cushion 3 (a fixed element), and a support base 4. Side lower ends of the seat back 2 are rotatably connected to side rear ends of the support base 4 via a pair of seat reclining devices 5 (one of which is shown). Side front ends of the seat cushion 3 are connected to side front ends of the support base 4 via a pair of front link members 4R (one of which is shown). Conversely, side rear ends of the seat cushion 3 are connected to the side lower ends of the seat back 2 via a pair of rear link members (not shown). Further, the support base 4 is slidably connected to a vehicle floor F via a slide mechanism 8 having slide lock devices 8C (lock devices), so as to longitudinally slide on the vehicle floor F.

The seat reclining devices 5 allow the seat back 2 to be rotated forward and rearward (i.e., counterclockwise and clockwise) around a (common) rotational axis 5R, and to be locked in a desired rotational position (a desired inclination angle). This allows the seat back 2 to be adjusted to a desired tilted position relative to the seat cushion 3 (the support base 4). Each of the seat reclining devices 5 is generally covered with a covering members (not shown) so as to not be visible externally. Further, each of the seat reclining devices 5 is normally locked. That is, each of the seat reclining devices 5 is maintained in a locked condition. However, each of the seat reclining devices 5 is constructed to be unlocked (i.e., switched to an unlocked condition) by operating a reclining lever (not shown), a walk-in lever (not shown) or a fold-down lever (not shown) each of which is attached to the seat back 2.

In addition, the seat reclining devices 5 are coupled to each other via a lateral rod (not shown), so as to be simultaneously or synchronously locked and unlocked when the reclining lever, the walk-in lever or the fold-down lever (which may be simply referred to as an operation lever) is operated. Therefore, the seat back 2 can be easily rotated relative to the seat cushion 3 by operating the operation lever, thereby enabling the seat back 2 to be tilted relative to the seat cushion 3, and to be locked in the desired tilted position.

Each of the seat reclining devices 50 may preferably include a biasing spring (not shown) that is positioned between the seat back 2 and the seat cushion 3. The biasing spring may normally bias the seat back 2 forwardly. Therefore, the seat back 2 can be automatically rotated or tilted forwardly when the seat reclining devices 5 are unlocked by operating the operating lever.

The seat 1 may preferably have a walk-in function (a walk-in mechanism). That is, the seat 1 is arranged and constructed to make a space between the seat 1 and a rear seat (not shown) when the passenger gets in and out the rear seat. In particular, the reclining devices 5 are constructed to rotate or tilt the seat back 2 forwardly from an original or use position (a predetermined rotational position) P to a tilted position P' when the walk-in lever is operated, which will be referred to as a tilting or half-folding operation. Conversely, the slide lock devices 8C of the slide mechanism 8 are respectively constructed to be changed from locked conditions to unlocked conditions via the switching mechanism 10 when the walk-in lever is operated, so that the support base 4 (the seat cushion 3) can be slid forwardly via the slide mechanism 8. Thus, the seat 1 is constructed such that when the walk-in lever is operated, the seat cushion 3 (the seat 1) can be slid forwardly from a predetermined longitudinal position T to a slid position T' (FIG. 1) while the seat back 2 is rotated from the use position P to the tilted position P'. Therefore, the space can be made between the seat 1 and the rear seat by operating the walk-in lever, so that the passenger can easily get in and out the rear seat via the space.

Further, the slide mechanism 8 is constructed of a pair of upper rails 8A that are attached to a lower surface of the support base 4 and a pair of lower rails 8B that are longitudinally disposed on the vehicle floor F. The upper rails 8A respectively slidably engage the lower rails 8B, so that the support base 4 is longitudinally slidably connected to the vehicle floor F.

The slide lock devices 8C of the slide mechanism 8 are respectively attached to the upper rails 8A. The slide lock devices 8C can respectively be changed between the locked conditions and unlocked conditions via the switching mechanism 10. In the locked conditions of the slide lock devices 8C, the slide lock devices 8C respectively engage the lower rails 8B, so as to prevent the support base 4 (the seat cushion 3) from sliding longitudinally (forwardly and rearwardly). Conversely, in the unlocked conditions of the slide lock devices 8C, the slide lock devices 8C are respectively disengaged from the lower rails 8B, so as to permit the support base 4 (the seat cushion 3) to slide longitudinally (forwardly and rearwardly) via the slide mechanism 8.

Also, the seat 1 may preferably have a fold-down function (a fold-down mechanism). That is, the seat 1 is arranged and constructed such that the seat back 2 can be folded over the seat cushion 3. In particular, the reclining devices 5 are constructed to rotate the seat back 2 forwardly from the use position P to a folded position P" when the fold-down lever is operated, which will be referred to as a folding operation. In addition, the seat 1 may preferably have a lowering function (a lowering mechanism). That is, the seat 1 is arranged and constructed such that seat cushion 3 can be lowered while moving forwardly. In particular, the front link members 4R are constructed to move the seat cushion 3 downwardly and forwardly when the fold-down lever is operated. Thus, when the fold-down lever is operated, the seat back 2 can be folded over the seat cushion 3 while the seat cushion 3 is lowered.

Further, constructions of the slide lock devices 8C of the slide mechanism 8, the reclining devices 5, and the walk-in and fold-down mechanisms are respectively disclosed in, for example, Japanese Laid-Open Patent Publication No. 2005-225262, Japanese Laid-Open Patent Publication No. 2007-130237, and U.S. Pat. No. 6,152,533, which patent references are hereby incorporated by reference in their entirety. Therefore, a description with regard to the constructions of the slide lock devices 8C of the slide mechanism 8, the reclining devices 5, and the walk-in and fold-down mechanisms will be omitted.

Next, the detailed representative embodiment will now described in detail with reference to FIGS. 2 to 7.

Figure 2:
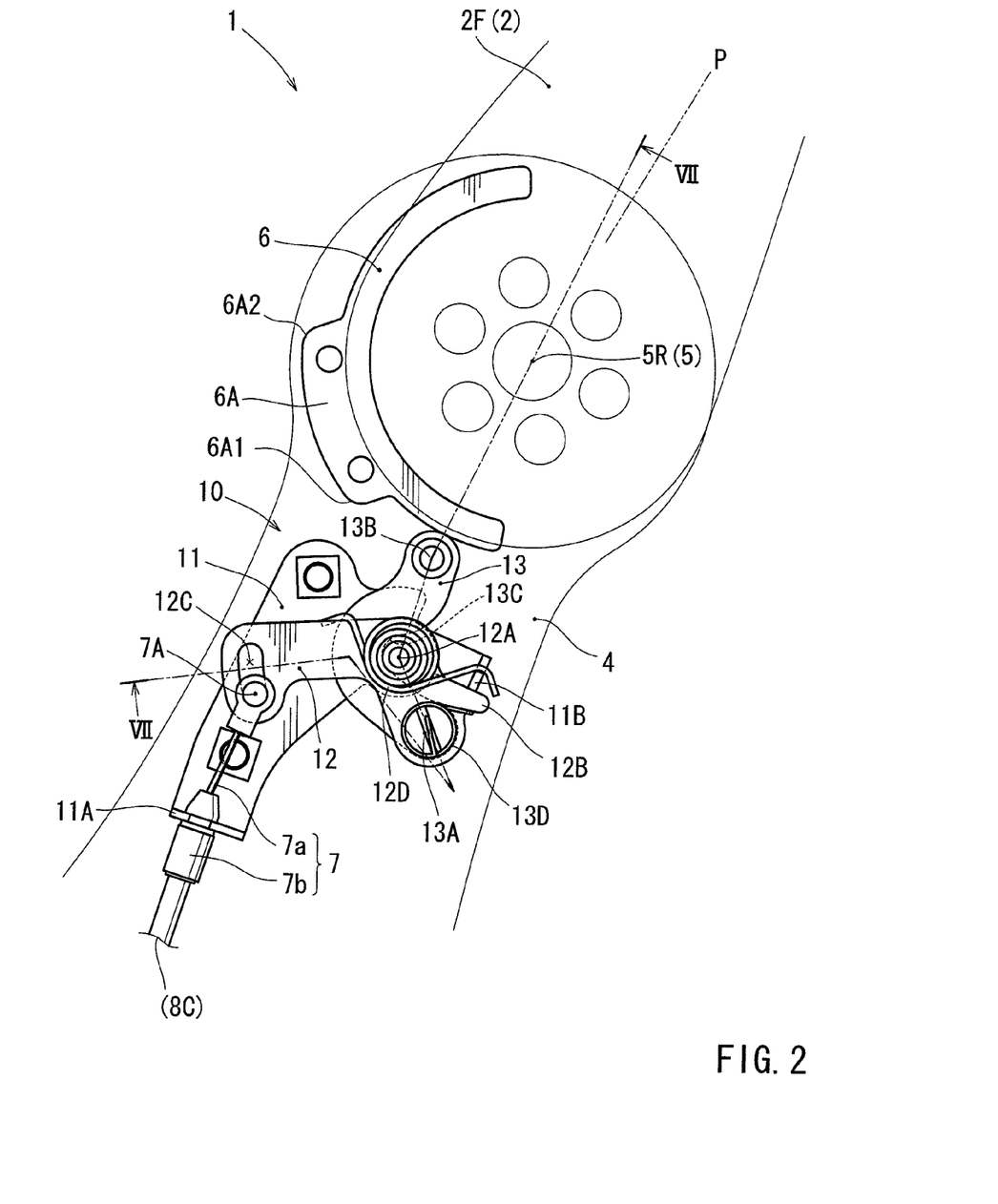
FIG. 2 is a side view of the seat, which illustrates a condition in which a seat back is in a use position.

As shown in FIG. 2, the switching mechanism 10 is composed of a plate-shaped base element 11, a plate-shaped output arm 12 and a plate-shaped input arm 13. The base element 11 is formed into an L-shape and is integrally attached to the support base 4. The base element 11 includes a cable engagement portion 11A and a spring engagement portion 11B that are respectively formed in its end portions by bending. The output arm 12 is pivotally connected to the base element 11 via a first pivot shaft 12A. In particular, a substantially central portion of the output arm 12 is integrally connected to the first pivot shaft 12A that is rotatably attached to the base element 11. Further, the input arm 13 is formed into a V-shape so as to have a concaved portion 13C. The concaved portion 13C may preferably be formed in a middle portion between first and second (lower and upper) end portions of the input arm 13. The input arm 13 is interleaved between the base element 11 and the output arm 12 while the first pivot shaft 12A is positioned in the concaved portion 13C. The input arm 13 thus positioned is pivotally connected to the output arm 12 via a second pivot shaft 13A (a rotational center). In particular, the first end portion (the lower end portion) of the input arm 13 is integrally connected to the second pivot shaft 13A that is rotatably attached to the output arm 12.

A torsion spring 12D (an output arm biasing member) is attached to the first pivot shaft 12A. Both ends of the torsion spring 12D are respectively engaged with a first arm portion (a left arm portion) of the output arm 12 and the spring engagement portion 11B of the base element 11, so that the output arm 12 can normally be rotationally biased counterclockwise (a normal rotational direction) about the first pivot shaft 12A with respect to the base element 11 via a spring force of the torsion spring 12D. As a result, as shown in FIG. 2, the output arm 12 is normally maintained in an initial rotational position in which an engagement strip 12B formed in a second arm portion (a right portion) of the output arm 12 contacts the spring engagement portion 11B of the base element 11. Further, the output arm 12 has an elongated slot 12C that is formed in the first arm portion thereof. The elongated slot 12C may preferably be shaped so as to extend in a rotational direction of the output arm 12.

A torsion spring 13D (an input arm biasing member) is attached to the second pivot shaft 13A. Both ends of the torsion spring 13D are respectively engaged with the second pivot shaft 13A and the engagement strip 12B of the output arm 12, so that the input arm 13 can normally be rotationally biased clockwise (a normal rotational direction) about the second pivot shaft 13A with respect to the output arm 12. Thus, the input arm 13 can normally be maintained in a position (a neutral rotational position) in which the input arm 13 is not rotated either clockwise or counterclockwise while the concaved portion 13C of the input arm 13 is contacting the first pivot shaft 12A (FIG. 2). Further, the input arm 13 has an engagement pin 13B (a force input point) that is attached to the second end portion (the upper end portion) thereof.

The switching mechanism 10 thus constructed is linked to the slide lock devices 8C via an operation cable 7 having an inner cable 7a and an outer cable 7b. In particular, as shown in, for example, FIGS. 2 and 7, a first end (an upper end) of the outer cable 7b of the operation cable 7 is connected to the cable engagement portion 11A of the base element 11. Conversely, a first end (an upper end) of the inner cable 7a of the operation cable 7 is slidably fitted to the elongated slot 12C via an engagement pin 7A attached thereto. Further, a second end (a lower end) of the outer cable 7b is connected to a cable engagement portion (not shown) formed in the support base 4. Conversely, a second end (a lower end) of the inner cable 7a is connected to operative portions (not shown) of the slide lock devices 8C.

Further, each of the slide lock devices 8C is constructed to be normally maintained in the locked condition, so that the support base 4 (the seat 1) can normally be prevented from sliding longitudinally. In other words, the operative portion of each of the slide lock devices 8C is normally maintained in an actuating position via a spring force of a tension spring (not shown) such that the slide lock device 8C is maintained in the locked condition. At this time, as shown in FIG. 2, the inner cable 7a connected to the operative portion of each of the slide lock devices 8C is being pulled downwardly (being pulled into the outer cable 7b), so that the engagement pin 7A attached thereto can be positioned at a first terminal end (a lower end) of the elongated slot 12C.

As will be recognized, when the operative portion of each of the slide lock devices 8C is operated against the spring force of the tension spring (i.e., when the inner cable 7a is pulled upwardly (pulled out of the outer cable 7b), the slide lock device 8C can be switched to the unlocked condition, thereby permitting the support base 4 (the seat 1) to slide longitudinally via the slide mechanism 8. Naturally, when the inner cable 7a is pulled downwardly again by the spring force of the tension spring, the slide lock device 8C can be returned to the locked condition.

Further, an arcuate rotary member 6 (a rotary cam or moving member) is attached to the seat back 2. In particular, as shown in, for example, FIGS. 2 and 7, the rotary member 6 is fixed to a back frame 2F of the seat back 2. The rotary member 6 may preferably be positioned, so as to swing about the rotational axis 5R of the reclining devices 5 when the seat back 2 is rotated via the reclining devices 5.

The rotary member 6 has an engagement projection 6A that is partially formed in an outer circumferential surface thereof. The engagement projection 6A has an arcuate shape extending along an arcuate profile of the rotary member 6. Further, the engagement projection 6A has circumferentially opposed end surfaces (first and second end surfaces). The opposed end surfaces are respectively gently inclined and are shaped so as to have a first rounded edge surface 6A1 (a first end edge) and a second rounded edge surface 6A2 (a second end edge).

Figure 3:
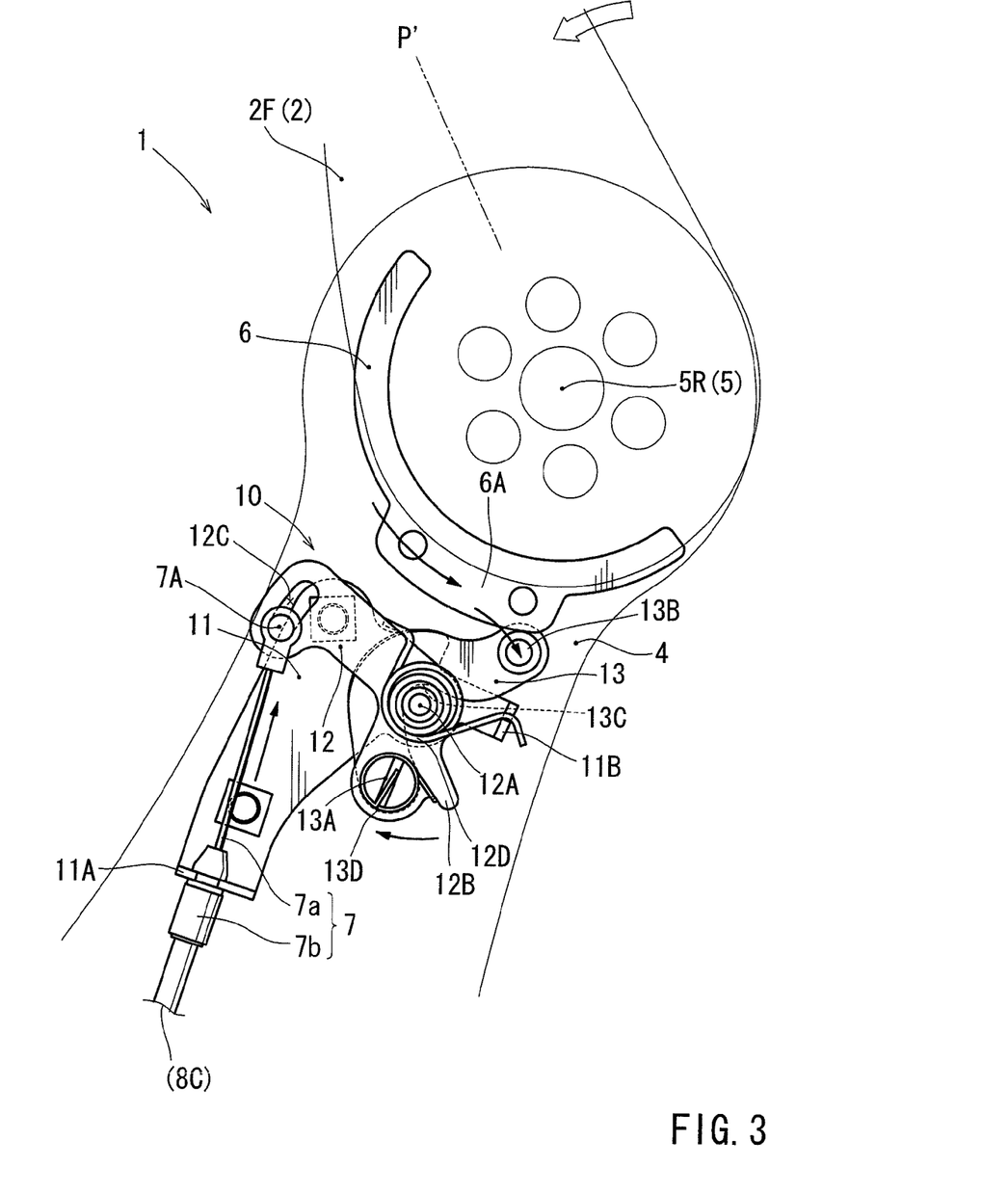
FIG. 3 is a side view of the seat, which illustrates a condition in which the seat back is rotated to a desired tilted position.
Figure 4:
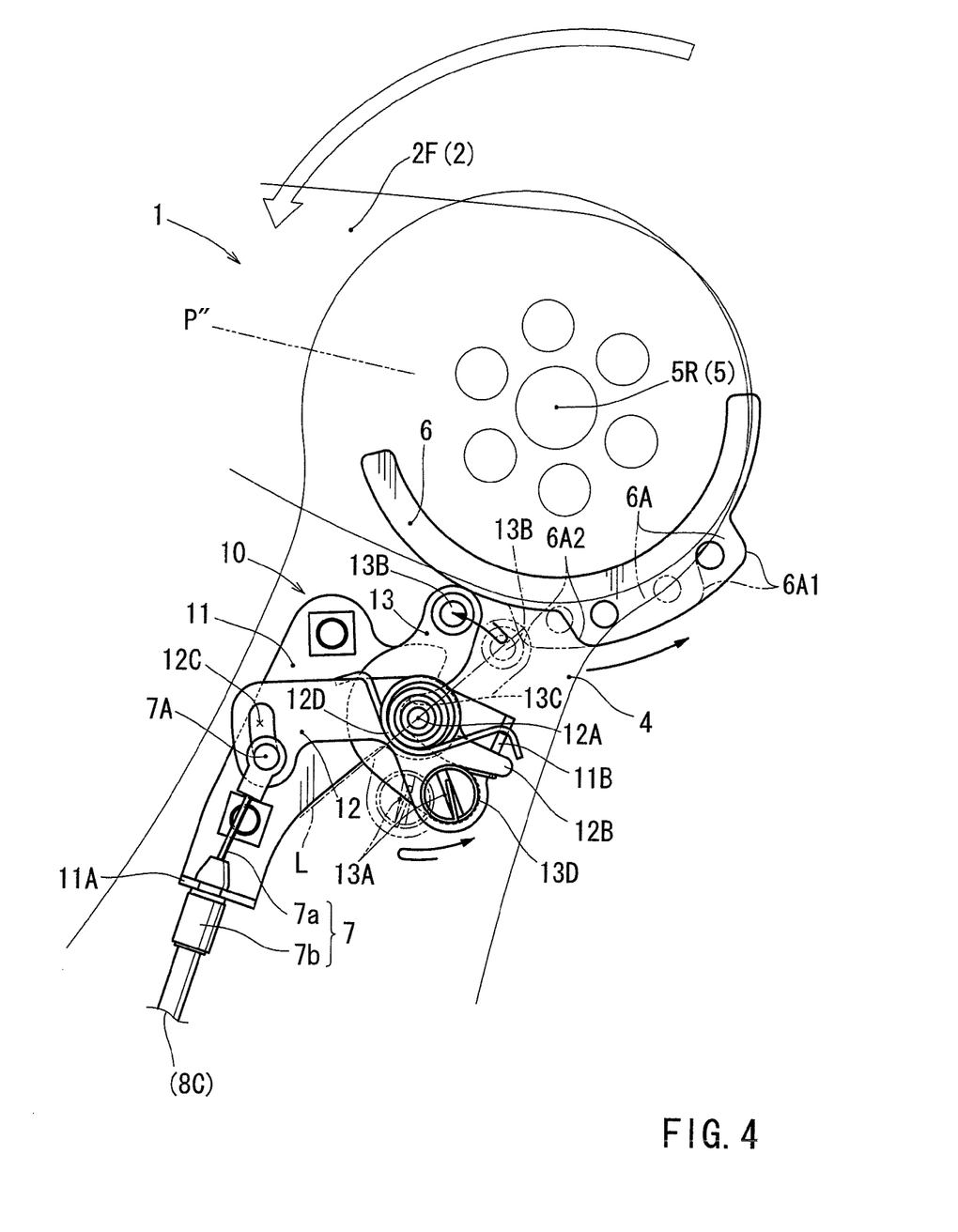
FIG. 4 is a side view of the seat, which illustrates a condition in which the seat back is rotated to a folded position.
Figure 5:
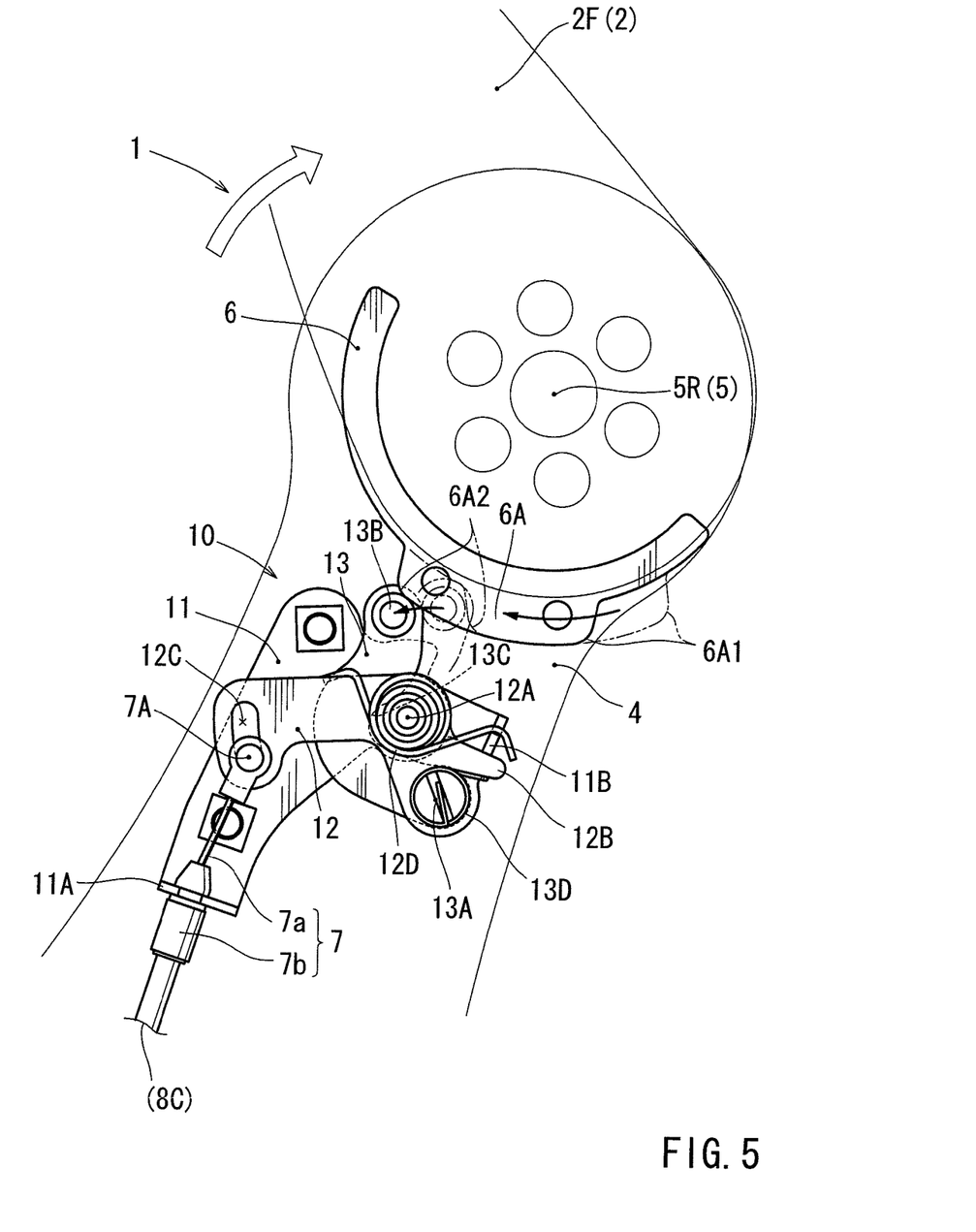
FIG. 5 is a side view of the seat, which illustrates a condition in which the seat back is raised from the folded position toward the use position.

Further, the rotary member 6 is positioned such that the engagement projection 6A can engage the engagement pin 13B of the input arm 13 when the seat back 2 is rotated from the original position P to the tilted position P' (FIG. 3). However, the rotary member 6 is positioned such that the engagement projection 6A can engage the engagement pin 13B of the input arm 13 and then be immediately disengaged therefrom when the seat back 2 is rotated from the original position P to the folded position P''' (FIG. 4).

Next, operation of the switching mechanism 10 will now be described.

First, as shown in FIG. 3, when the walk-in lever is operated, the seat back 2 is rotated forwardly from the original position P to the tilted position P' via the reclining devices 5 and is maintained in the tilted position P'. When the seat back 2 is rotated forwardly, the rotary member 6 associated with the seat back 2 swings or rotates counterclockwise (a normal rotational direction) about the rotational axis 5R of the reclining devices 5. Upon swing of the rotary member 6, the engagement projection 6A of the rotary member 6 can engage and press the engagement pin 13B of the input arm 13, so that a normal directional input force can be applied to the input arm 13 (the switching mechanism 10) via the engagement pin 13B (the force input point). As a result, the input arm 13 can be rotated clockwise (a normal rotational direction) around the first pivot shaft 12A while the concaved portion 13C of the input arm 13 is contacting the first pivot shaft 12A. Consequently, the second pivot shaft 13A pivots clockwise (a normal rotational direction) about the first pivot shaft 12A. Thus, the output arm 12 can be applied with an output force, so as to be rotated clockwise (a reverse rotational direction) from the initial rotational position to an actuating rotational position about the first pivot shaft 12A against the spring force of the torsion spring 12D.

As shown in FIG. 3, upon clockwise rotation of the output arm 12 toward the actuating rotational position, the inner cable 7a of the operation cable 7 associated with the output arm 12 can be pulled upwardly. As a result, the operative portion of each of the slide lock devices 8C is operated against the spring force of the tension spring, so that the slide lock device 8C can be switched to the unlocked condition. Consequently, the support base 4 can slide forwardly via the slide mechanism 8. Thus, when the walk-in lever is operated, the seat back 2 is rotated to the tilted position P' and at the same time, the seat cushion 3 (the seat 1) is slid forwardly from the predetermined longitudinal position T to the slid position T' (FIG. 1).

Conversely, as shown in FIG. 4, when the fold-down lever is operated, the seat back 2 is rotated forwardly from the original position P to the folded position P''' via the reclining devices 5. In particular, when the fold-down lever is operated, the seat back 2 is rotated from the original position P to the tilted position P' (FIG. 3) and is then immediately rotated to the folded position P''' (FIG. 4).

Upon rotation of the seat back 2 to the tilted position P', the rotary member 6 associated with the seat back 2 swings counterclockwise about the rotational axis 5R of the reclining devices 5, so that the engagement projection 6A can engage the engagement pin 13B of the input arm 13 (FIG. 3). As a result, the slide lock device 8C can be switched to the unlocked condition in the same manner as described above. Therefore, the seat cushion 3 (the seat 1) can be slid forwardly toward the slid position T' (FIG. 1).

However, the seat back 2 can be rotated toward the folded position P''' immediately after the seat back 2 reaches the tilted position P'. Upon rotation of the seat back 2 toward the folded position P''' beyond the tilted position P', the engagement projection 6A can be immediately disengaged from the engagement pin 13B of the input arm 13. As a result, as shown in FIG. 4, the output arm 12 can be rotated counterclockwise (the normal rotational direction) from the actuating rotational position to the initial rotational position via the spring force of the torsion spring 12D. Further, at this time, the second pivot shaft 13A can pivot counterclockwise (a reverse rotational direction) about the first pivot shaft 12A. Therefore, the input arm 13 can be rotated counterclockwise (a reverse rotational direction) around the first pivot shaft 12A while the concaved portion 13C of the input arm 13 is contacting the first pivot shaft 12A, so as to be returned to the neural rotational position.

As shown in FIG. 4, upon counterclockwise rotation of the output arm 12 to the initial rotational position, the inner cable 7a of the operation cable 7 associated with the output arm 12 is permitted to be pulled back into the outer cable 7b of the operation cable 7. As a result, the operative portion of each of the slide lock devices 8C is returned to the actuating position via the spring force of the tension spring, so that the slide lock device 8C can be switched to the locked condition again. Consequently, the seat cushion 3 (the seat 1) can be immediately stopped from being slid forwardly. Thus, when the fold-down lever is operated, the seat back 2 is rotated to the folded position P''' while the seat cushion 3 (the seat 1) is substantially prevented from being slid forwardly (i.e., while the seat 1 is substantially maintained in the predetermined longitudinal position T shown in FIG. 1).

Next, in order to return the seat back 2 from the folded position P''' to the original position P, the seat back 2 can be simply raised or rotated rearwardly. When the seat back 2 is rotated rearwardly, the rotary member 6 associated with the seat back 2 swings clockwise (a reverse rotational direction) about the rotational axis 5R of the reclining devices 5. As shown by broken line in FIG. 5, upon rotation of the seat back 2 to the tilted position P', the engagement projection 6A of the rotary member 6 can engage and press the engagement pin 13B of the input arm 13, so that a reverse directional input force can be applied to the input arm 13 (the engagement pin 13B). As a result, as shown by solid line in FIG. 5, the input arm 13 can be independently (idly) rotated counterclockwise (the reverse rotational direction) about the first second pivot shaft 13A (the rotational center) against a spring force of the torsion spring 13D while the concaved portion 13C of the input arm 13 is spaced from the first pivot shaft 12A. At this time, the second pivot shaft 13A cannot be displaced or moved. Thus, the output arm 12 cannot be applied with any force, so as to be maintained in the initial rotational position. As a result, the inner cable 7a of the operation cable 7 associated with the output arm 12 cannot be pulled upwardly, so that the slide lock device 8C can be maintained in the locked condition.

Figure 6:
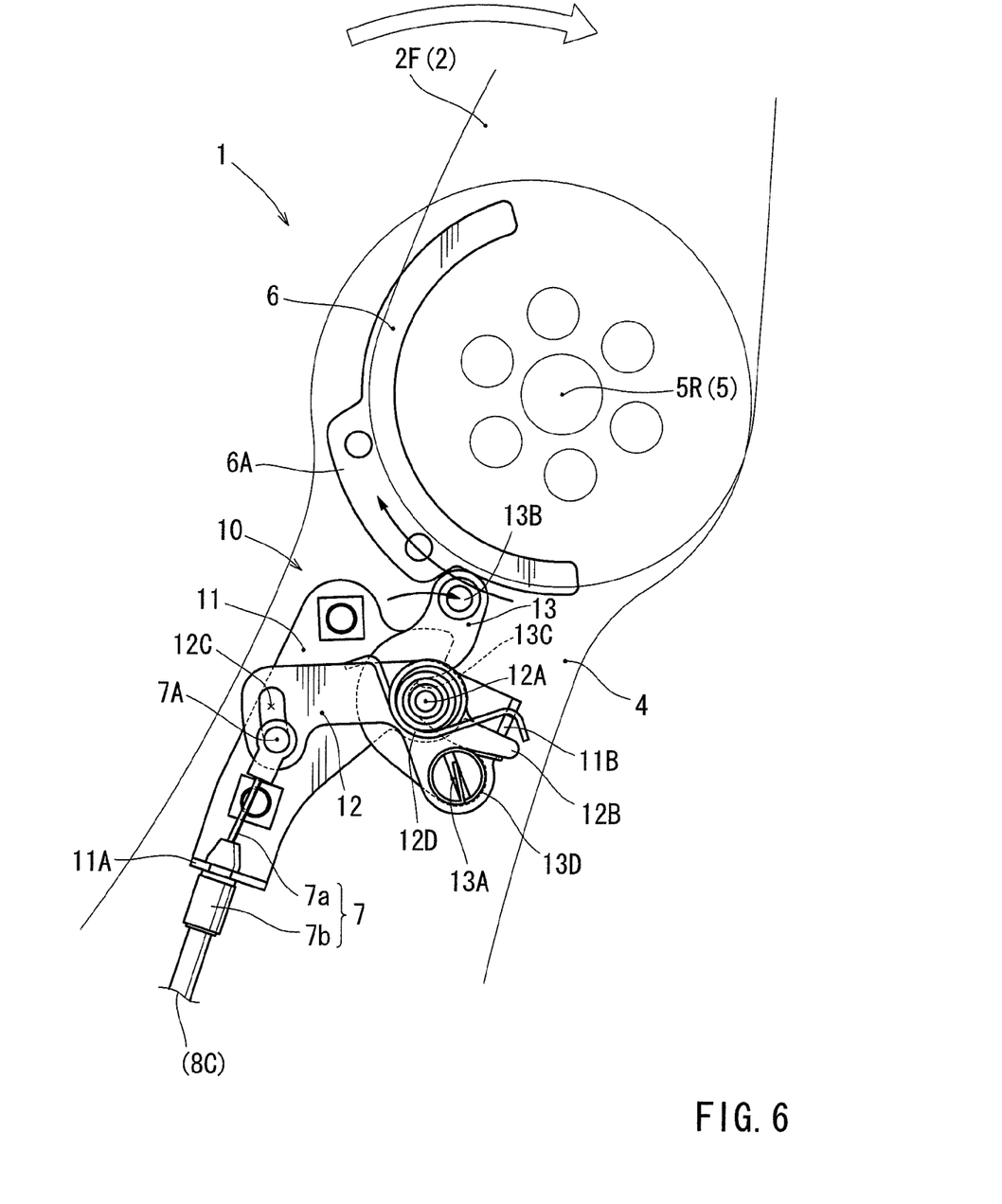
FIG. 6 is a side view of the seat, which illustrates a condition in which the seat back is returned to the use position.
Figure 7:
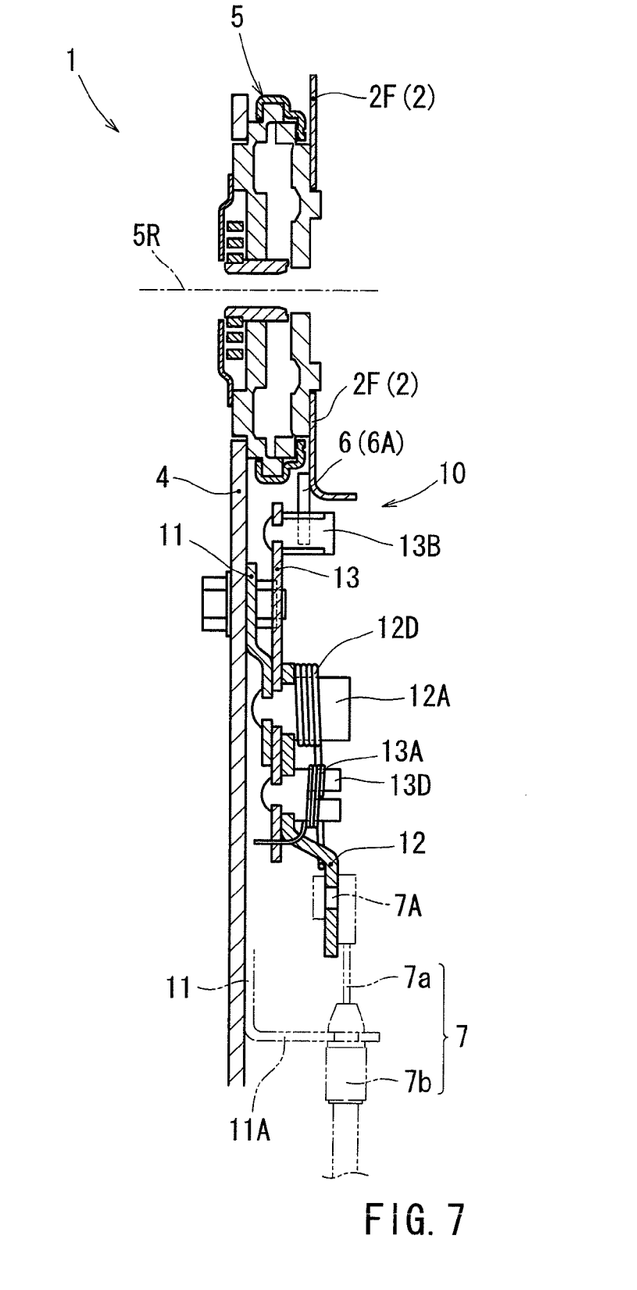
FIG. 7 is a cross-sectional view taken along line VII-VII in FIG. 2.

As shown in FIG. 6, when the seat back 2 is further raised or rotated rearwardly toward the folded position P''' beyond the tilted position P', the engagement projection 6A is disengaged from the engagement pin 13B of the input arm 13. As a result, the input arm 13 can be rotated clockwise (a normal rotational direction) about the second pivot shaft 13A via the spring force of the torsion spring 13D, so as to be returned to the neutral rotational position in which the concaved portion 13C of the input arm 13 is contacting the first pivot shaft 12A (FIG. 6). At this time, the second pivot shaft 13A cannot be displaced, so that the output arm 12 can be maintained in the initial rotational position. Therefore, the inner cable 7a of the operation cable 7 associated with the output arm 12 cannot be operated, so that the slide lock device 8C can be maintained in the locked condition.

As described above, when the seat back 2 is raised or rotated rearwardly toward the original position P, the input arm 13 can be independently (idly) rotated about the second pivot shaft 13A. Therefore, the output arm 12 can be maintained in the initial rotational position in which the engagement strip 12B of the output arm 12 contacts the spring engagement portion 11B of the base element 11. Consequently, the seat back 2 can be raised or rotated rearwardly toward the original position P while the slide lock devices 8C of the slide mechanism 8 are respectively maintained in the locked conditions.

Further, as shown by broken lines in FIG. 4, if the seat back 2 is raised or rotated rearwardly toward the original position P immediately before the engagement projection 6A is disengaged from the engagement pin 13B of the input arm 13 during the folding operation, the reverse directional input force can be applied to the engagement pin 13B of the input arm 13 via the second edge surface 6A2 of the engagement projection 6A.

At this time, a line of action L of the reverse directional input force applied to the engagement pin 13B is directed to a normal line at a contacting point of the second edge surface 6A2 of the engagement projection 6A and the engagement pin 13B of the input arm 13. However, the line of action L is offset from the second pivot shaft 13A that functions as a pivot of the input arm 13. Therefore, the input arm 13 can be independently rotated counterclockwise about the second pivot shaft 13A against the spring force of the torsion spring 13D, so as to absorb the pressing force applied thereto. As a result, the seat back 2 can be smoothly returned rearwardly even when the engagement projection 6A is just disengaged from the engagement pin 13B of the input arm 13 during the folding operation.

According to the switching mechanism 10 of the present embodiment, when the seat back 2 is rotated forwardly, the input arm 13 can be rotated clockwise (the normal rotational direction), thereby rotating the output arm 12 clockwise. At this time, the input arm 13 can be rotated around the first pivot shaft 12A while the concaved portion 13C of the input arm 13 is contacting the first pivot shaft 12A (FIG. 3). In other words, the input arm 13 cannot be rotated about the second pivot shaft 13A. As a result, when the input arm 13 is rotated in the normal rotational direction, the input arm 13 may have a reduced radius of rotation.

Conversely, when the seat back 2 is rotated rearwardly, the input arm 13 can be idly rotated counterclockwise (the reverse rotational direction) about the second pivot shaft 13A. As a result, when the input arm 13 is idly rotated in the reverse rotational direction, the input arm 13 may have an increased radius of rotation.

Thus, according to the switching mechanism 10, the input arm 13 can be rotated in the reverse rotational direction in the increased radius of rotation. However, the input arm 13 can be rotated in the normal rotational direction in the reduced radius of rotation. As a result, the switching mechanism 10 can be downsized without reducing performance thereof.

Further, as previously described, when the seat back 2 is raised or rotated rearwardly toward the original position P immediately before the engagement projection 6A is disengaged from the engagement pin 13B of the input arm 13 during the folding operation, the reverse directional input force can be applied to the engagement pin 13B of the input arm 13 via the second edge surface 6A2 of the engagement projection 6A. However, the line of action L of the reverse directional input force applied to the engagement pin 13B is offset from the second pivot shaft 13A. Therefore, the input arm 13 can be easily rotated counterclockwise about the second pivot shaft 13A without applying an excessive load to the second pivot shaft 13A. As a result, the seat back 2 can be smoothly raised or rotated (returned) rearwardly even when the engagement projection 6A is just disengaged from the engagement pin 13B of the input arm 13 during the folding operation.

Various changes and modifications may be made to the representative embodiment without departing from the scope of the present invention. For example, in the present embodiment, the switching mechanism 10 is applied to the slide lock devices 8C of the slide mechanism 8. However, the switching mechanism 10 can be applied to a lock device, e.g., a lock device taught by Japanese Laid-Open Patent Publication Number 2008-114690.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A switching mechanism of a vehicle seat having a seat cushion and a seat back, comprising:
    a base element,
    an output arm pivotally connected to the base element via a first pivot shaft,
    an input arm having a force input point and pivotally connected to the output arm via a second pivot shaft as a rotational center, and
    an input arm biasing member that is arranged and constructed to normally bias the input arm in a normal rotational direction, so that the input arm can contact the first pivot shaft at a middle portion of the input arm between the force input point and the rotational center,
    wherein when a normal directional input force is applied to the input arm, the input arm can be rotated around the first pivot shaft in the normal rotational direction while contacting the first pivot shaft, so that the second pivot shaft can pivot about the first pivot shaft, thereby rotating the output arm about the first pivot shaft with the input arm to rotate the seat back from a seating position into one of a walk in position and a folded position, and
    wherein when a reverse directional input force is applied to the input arm, the input arm can be independently rotated in a reverse rotational direction about the second pivot shaft against a spring force of the input arm biasing member to rotate the seat back towards the seating position.

2. The switching mechanism as defined in claim 1, wherein the input arm is arranged and constructed to be rotated in the normal or reverse rotational direction when the input arm is engaged with a moving member.

3. The switching mechanism as defined in claim 2, wherein the input arm is arranged and constructed to be rotated in the reverse rotational direction with the output arm when the input arm is disengaged from the moving member after the input arm is rotated in the normal rotational direction.

4. The switching mechanism as defined in claim 2, wherein the input arm is arranged and constructed to be independently rotated in the normal rotational direction when the input arm is disengaged from the moving member after the input arm is rotated in the reverse rotational direction.

5. The switching mechanism as defined in claim 2, wherein the moving member comprises a rotary cam that is engageable with the input arm, and wherein the second pivot shaft is positioned so as to be offset from a line of action of reverse directional input force applied to the input arm via the rotary cam when the rotary cam is rotated in a normal rotational direction to engage and rotate the input arm in the normal rotational direction and is then rotated in a reverse rotational direction immediately before the rotary cam is disengaged from the input arm.

6. The switching mechanism as defined in claim 5, wherein the rotary cam is attached to a seat back so as to be rotated with the seat back, wherein when the seat back is rotated from a use position to a half-folded position, the input arm is rotated in the normal rotational direction by the rotary cam, so that the output arm can be rotated from an initial rotational position to an actuating rotational position with the input arm, and wherein when the seat back is rotated toward a folded position beyond the half-folded position, the input arm is disengaged from the rotary cam, so that the output arm can be returned to the initial rotational position with the input arm.

7. The switching mechanism as defined in claim 6, wherein the output arm is linked to a slide lock device of a slide mechanism of the vehicle seat, so as to unlock the slide lock device when the output arm is rotated to the actuating rotational position.

* * * * *